United States Patent
Lund et al.

(10) Patent No.: US 10,596,628 B2
(45) Date of Patent: Mar. 24, 2020

(54) SYSTEMS AND METHODS FOR CREATING NANOCRYSTALLINE ALLOY ARTICLES USING ADDITIVE MANUFACTURING

(71) Applicant: Veloxint Corporation, Framingham, MA (US)

(72) Inventors: Alan C. Lund, Framingham, MA (US); Christopher A. Schuh, Wayland, MA (US)

(73) Assignee: Veloxint Corporation, Framingham, MA (US)

( * ) Notice: Subject to any disclaimer, the term of this patent is extended or adjusted under 35 U.S.C. 154(b) by 125 days.

(21) Appl. No.: 15/449,475

(22) Filed: Mar. 3, 2017

(65) Prior Publication Data

US 2017/0252807 A1 Sep. 7, 2017

Related U.S. Application Data

(60) Provisional application No. 62/303,288, filed on Mar. 3, 2016.

(51) Int. Cl.
| | | |
|---|---|---|
| *B22F 3/105* | (2006.01) | |
| *B33Y 10/00* | (2015.01) | |
| *B33Y 70/00* | (2020.01) | |
| *B22F 3/10* | (2006.01) | |
| *B22F 1/00* | (2006.01) | |
| *C22C 27/04* | (2006.01) | |

(Continued)

(52) U.S. Cl.
CPC ............ *B22F 3/1055* (2013.01); *B22F 1/007* (2013.01); *B22F 1/0062* (2013.01); *B22F 1/025* (2013.01);

(Continued)

(58) Field of Classification Search
CPC ...... B22F 3/1055; B22F 3/1021; B22F 1/007; B22F 3/008; B22F 1/025; B22F 3/1035;

(Continued)

(56) References Cited

U.S. PATENT DOCUMENTS

| 5,431,967 A | 7/1995 | Manthiram et al. |
| 10,209,208 B2 | 2/2019 | Murdoch et al. |

(Continued)

FOREIGN PATENT DOCUMENTS

| JP | 2015-218395 A | 12/2015 |
| WO | WO 2013/137857 A2 | 9/2013 |

(Continued)

OTHER PUBLICATIONS

Gu, D. et al. (Aug. 2009) "In-situ TiC particle reinforced Ti-Al matrix composites: Powder preparation by mechanical alloying and Selective Laser Melting behavior" *App Surface Sci*, 255(22):9230-9240.

(Continued)

*Primary Examiner* — Jessee R Roe
*Assistant Examiner* — Rebecca Janssen
(74) *Attorney, Agent, or Firm* — Cooley LLP

(57) ABSTRACT

Embodiments described herein relate generally to systems and methods for using nanocrystalline metal alloy particles or powders to create nanocrystalline and/or microcrystalline metal alloy articles using additive manufacturing. In some embodiments, a manufacturing method for creating articles includes disposing a plurality of nanocrystalline particles and selectively binding the particles together to form the article. In some embodiments, the nanocrystalline particles can be sintered to bind the particles together. In some embodiments, the plurality of nanocrystalline particles can be disposed on a substrate and sintered to form the article. The substrate can be a base or a prior layer of bound particles. In some embodiments, the nanocrystalline particles can be selectively bound together (e.g., sintered) at substantially the same time as they are disposed on the substrate.

19 Claims, 3 Drawing Sheets

(51) Int. Cl.
*B22F 3/00* (2006.01)
*B22F 1/02* (2006.01)

(52) U.S. Cl.
CPC ............ *B22F 3/008* (2013.01); *B22F 3/1021* (2013.01); *B22F 3/1035* (2013.01); *B33Y 10/00* (2014.12); *B33Y 70/00* (2014.12); *C22C 27/04* (2013.01); *B22F 1/02* (2013.01); *B22F 2301/20* (2013.01); *B22F 2302/45* (2013.01); *B22F 2998/10* (2013.01); *C22C 2200/04* (2013.01); *Y02P 10/295* (2015.11)

(58) Field of Classification Search
CPC ...... B22F 1/0062; B22F 1/02; B22F 2998/10; B22F 2301/20; B22F 2302/45; B33Y 70/00; B33Y 10/00; C22C 27/04; C22C 2200/04; Y02P 10/295
USPC .......................................................... 419/38
See application file for complete search history.

(56) References Cited

U.S. PATENT DOCUMENTS

| | | |
|---|---|---|
| 2006/0251535 A1 | 11/2006 | Pfeifer et al. |
| 2007/0243335 A1* | 10/2007 | Belashchenko ....... B22F 1/0096 427/451 |
| 2009/0321971 A1* | 12/2009 | Brodkin ............. A61C 13/0006 264/17 |
| 2014/0271325 A1 | 9/2014 | Schuh et al. |
| 2014/0348203 A1 | 11/2014 | Murdoch et al. |
| 2014/0349132 A1 | 11/2014 | Uhlmann et al. |
| 2015/0069649 A1 | 3/2015 | Bai et al. |
| 2015/0125338 A1 | 5/2015 | Murdoch et al. |
| 2019/0257775 A1 | 8/2019 | Murdoch et al. |

FOREIGN PATENT DOCUMENTS

| | | |
|---|---|---|
| WO | WO 2014/152838 A1 | 9/2014 |
| WO | WO 2014/189924 A2 | 11/2014 |

OTHER PUBLICATIONS

Gu, D. (Jan. 2015) "Nano/Micron W-Cu Composites by Direct Metal Laser Sintering (DMLS) Additive Manufacturing (AM): Unique Laser-Induced Metallurgical Behavior of Insoluble System" Chapter 9 in *Laser Additive Manufacturing of High-Performance Materials*. Berlin Heidelberg: Springer-Verlag; pp. 273-301.

Notice of Reasons for Rejection dated Nov. 27, 2019 for Japanese Application No. 2018-566192, with English translation, 12 pages.

* cited by examiner

SYSTEMS AND METHODS FOR CREATING NANOCRYSTALLINE ALLOY ARTICLES USING ADDITIVE MANUFACTURING

CROSS-REFERENCE TO RELATED APPLICATIONS

This application claims priority to and the benefit of U.S. Provisional Application No. 62/303,288, filed Mar. 3, 2016, the disclosure of which is hereby incorporated by reference in its entirety.

BACKGROUND

As an important, rapidly emerging, manufacturing technology, additive manufacturing has the potential to revolutionize the global parts manufacturing and logistics landscape. For example, additive manufacturing can enable distributed manufacturing and the production of parts-on-demand while offering the potential to reduce cost, energy consumption, and carbon footprint.

SUMMARY

Embodiments described herein relate generally to systems and methods for using nanocrystalline metal alloy particles or powders to create nanocrystalline and/or microcrystalline metal alloy articles using additive manufacturing. In some embodiments, a manufacturing method for creating articles includes disposing a plurality of nanocrystalline particles and selectively binding the particles together to form the article. In some embodiments, the nanocrystalline particles can be sintered to bind the particles together. In some embodiments, the plurality of nanocrystalline particles can be disposed on a substrate and sintered to form the article. The substrate can be a base or a prior layer of bound particles. In some embodiments, the nanocrystalline particles can be selectively bound together (e.g., sintered) at substantially the same time as they are disposed on the substrate.

DETAILED DESCRIPTION

Figure 1:
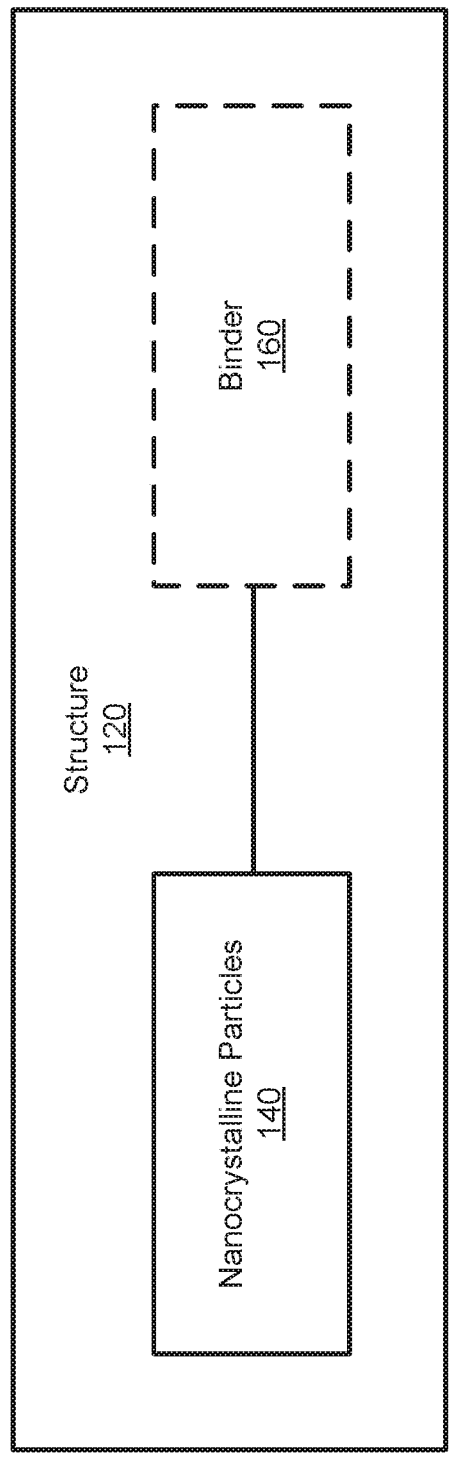
FIG. 1 shows a schematic block diagram for creating a green body comprising nanocrystalline alloy particles using additive manufacturing, according to an embodiment.

Embodiments described herein relate generally to systems and methods for using nanocrystalline metal alloy particles (also referred to herein as powders) to create metal alloy articles using additive manufacturing. In some embodiments, a manufacturing method for creating articles includes disposing a plurality of nanocrystalline particles and selectively binding the particles together to form the article. In some embodiments, the nanocrystalline particles can be sintered to bind the particles together. In some embodiments, the plurality of nanocrystalline particles can be disposed on a substrate and sintered to form the article. The substrate can be a base or a prior layer of bound particles. In some embodiments, the nanocrystalline particles can be selectively bound together (e.g., sintered) at substantially the same time as they are disposed on the substrate.

In some embodiments, a manufacturing method for creating an article includes disposing a plurality of nanocrystalline particles and selectively binding the particles together (e.g., by an additive manufacturing or 3D printing process) to form a green body. The green body can then be sintered at a sintering temperature to form a monolithic alloy article. In some embodiments, disposing the plurality of nanocrystalline particles and sintering can be done together to form the monolithic alloy article.

In some embodiments, the systems and methods for creating a bulk nanocrystalline and/or microcrystalline article include combining a plurality of nanocrystalline particles and a binder to create an intermediate material. The intermediate material is then selectively bound together (e.g., by an additive manufacturing) to form a green body. The green body can then be sintered at a sintering temperature to form a monolithic microcrystalline or nanocrystalline alloy article. In some embodiments, there is no binder used in creating in a green body. In some embodiments, the particles are sintered as they are disposed or deposited and there is no intermediate green body formed.

In some embodiments, the method includes using a binder that has a volatilization temperature lower than the sintering temperatures. In some embodiments, the binder is at least one of a wax, a polymer, and a metal. In some embodiments, the binder is formulated to substantially vaporize during the sintering. In some embodiments, no binder is used in creating in a green body. In some embodiments, the particles are sintered as they are disposed or deposited and there is no intermediate green body formed.

As described herein, additive manufacturing (also referred to as direct digital manufacturing, free form fabrication, 3D printing, etc.), is transforming the prototyping and design process. As additive manufacturing technologies continue to evolve, it has the potential to revolutionize customized manufacturing and product development processes. The material science, synthesis processes, and business consideration associated with achieving these performance gains may cause a paradigm shift in the research and development of fully exploitable additive manufacturing technologies.

Overall, additive manufacturing systems can be categorized, for example, in terms of the material feedstock, energy source, and build volume, among many other determining factors. Although there are many commercially available systems, the energy sources used in most commercially available additive manufacturing systems include an electron beam system, a high power laser system, or a plasma transferred arc system. Alternatively some systems use a combination of powder and binder created using 3D inkjet-like printer systems. In some cases parts created through 3D inkjet-line printing are heated after printing to set or sinter the parts. The additive manufacturing systems are further divided into three broad categories: powder bed systems, powder feed systems, and wire feed systems.

The powder bed systems are capable of producing build volumes less than 0.03 cubic meters ($m^3$). In a powder bed electron beam system, a powder bed is created by raking powders across the work area. The energy source (either an electron beam or a laser beam) or binder source is programmed to deliver energy or binder to the surface of the bed melting, sintering or binding the powders into the desired shape. Additional powder is raked across the work area, and the process is repeated to create a solid three dimensional component. The advantages of this system include its ability to produce high resolution features, internal passages, such as cavities and hollow features, and while maintaining dimensional control.

Unlike the powder bed systems, the powder feed systems are capable of building larger volumes, generally greater than 1.2 m³. An advantage of powder feed systems is that these systems can be readily modified for volume scale up compared to the fairly limiting powder bed systems. In the powder feed systems, powders with or without binders are conveyed through a nozzle onto the build surface. A high power laser or an electron beam can then be used to melt a monolayer or more of the powders into the desired shape or outline, or the entire part can be heated after processing to set or sinter the materials. This process is repeated to create a solid three dimensional component. Within the powder feed systems, there are two dominant types of systems currently available in the industry. The first type is a system in which the work piece remains stationary and deposition head moves for positioning, and the second type is another system in which the deposition head remains stationary and the work piece is moved around for positioning.

Differing from the two systems above is the wire feed system. The wire feed system includes a wire as a feedstock and the energy source for these units can include an electron beam system, a higher power laser beam system, and plasma transferred arc system. In a wire feed system, a single bead of material is initially deposited and subsequent passes are utilized to build upon to develop a three dimensional structure. In general, the wire feed systems are well suited for high deposition rate processing and are capable of producing large build volumes, however, the fabricated additive manufacturing products usually require more and extensive machining, compared to those products created by either the powder bed or powder feed systems.

As described herein, additive manufacturing is a layer by layer manufacturing process. Materials processed using an additive manufacturing technique can experience complex thermal processing cycles. Generally, there is a need to better understand the link between microstructure, processing, and properties for additive manufacturing fabricated parts, as well as developing an additive manufacturing materials database. In other words, since individual layers of material are "cast" layer by layer during additive manufacturing, each layer can possess a unique temperature profile, and collectively, that can result in a fabricated part having a very complex, time dependent temperature profiles within the part. The consequence is that the material may experience repeated solid state and liquid-solid phase transformations or repeated softening and hardening cycles. Depending upon a number of variables including the additive manufacturing equipment, the time between passes, and the size of the part being fabricated, the end product may have differing physical properties. In general, additive manufacturing of metals is a relatively rapid solidification process. The heat flow in metal additive manufacturing processes can cause directional anisotropic solidification frequently resulting in columnar microstructures. Although capable of producing a mixed columnar and equiaxed structures, the combined effect of rapid solidification, directional cooling, and phase transformations induced by repeated thermal cycles has a profound influence on the microstructures of the materials produced and their resultant properties.

Rapid solidification reduces elemental partitioning and extends solid solubility and can result in metastable phase formation. Directional heat extraction may result in preferred directionality in grain growth. Repeated thermal cycles can have a complex set of effects, including microstructural banding, i.e., microstructural differences between deposition layers and re-melting resulting in a strong texture as a result of epitaxial growth nucleating on columnar grain sites. A strong anisotropy in fracture behavior can be observed and attributed to related manufacturing defects in metal additive manufacturing parts.

Another typical defect observed in additive manufacturing products are micro-porosity due to lack of fusion. These defects are particularly prevalent in cases where metal powders are sintered rather than melted, and are a primary reason that melting processes have generally been preferred commercially to sintering process. Micro-porosity (10-50 μm at less than 1 vol. %) has also been observed and attributed to gas entrapment due to rapid cooling. The typically observed columnar grains can be observed growing in the z-direction (i.e., perpendicular to the build plane) and in the direction of heat extraction. Although columnar grain growth is observed in materials produced by multiple systems, it is less prominent in a single pass laser system. In general, the microstructure of laser powder blown materials appears finer in structure than those produced by wire feed systems. This can be attributed to the larger melt pool (as likely slower cooling rates) associated with the wire feed systems. In addition, fatigue cracks have been observed to initiate at pores and cavities close to the surface for some additive manufacturing products. Porosity can in some cases be attributed to the absorption of N, O, and H in the molten weld pool, which then nucleates at the solid-liquid interface during solidification. The fatigue life of most of the additive manufacturing products can be controlled; however, a small number often still fail at a very early stage of testing due to local defects such as those described herein.

In summary, additively manufactured metals and alloys have a complex thermal history involving directional heat extraction, and repeated melting and rapid solidification. Typically, additive manufacturing fabricated metals and alloys also experience repeated solid state phase transformations. These factors introduce complexities not typically found in conventional processes. The nanostructure or microstructure of these materials (e.g., metals or alloys) can be substantially modified or altered during additive manufacturing; control of shape often comes at the detriment of control of microstructure. As control of microstructure enables control of the properties of the final product, the properties of additively manufactured metals and alloys have generally been inconsistent and inferior to those of equivalent metals or alloys produced through other means (such as casting, forging, etc.).

Currently available additive manufacturing technologies utilize metal-only components, such as metal or alloy powders or wire, as the raw feedstock materials. During additive manufacturing, the metal or alloy particles or wires can actually be melted or sintered by the energy source employed in the specific additive manufacturing system. Therefore, the energy input can be high enough to substantially melt or sinter the raw powder or wire feedstock materials. Additionally, the high temperature accompanying the influx of energy can transform the microstructure of the powder or wire feedstock materials. Said another way, when enough energy is introduced into a metal or an alloy system to cause substantial melting or otherwise sintering, that high energy can also activate any number of microstructure or nanostructure transformation processes, including grain boundary diffusion, bulk diffusion, dislocation movements, grain growth, nucleation, precipitation formation, phase transformation, and the like.

Nanocrystalline metals and alloys provide substantially improved properties relatively to traditional microcrystalline metals and alloys of the same chemistry, including improvements in mechanical properties, corrosion performance, and magnetic properties. Traditional metal forming and sintering techniques typically require high temperatures, which can lead to undesired grain growth in nanocrystalline metals and alloys. Producing bulk nanocrystalline materials with high relative densities and limited grain growth can thus be challenging and difficult to achieve. Additionally, powder metallurgy sintering techniques often also require applied pressure to consolidate the final metal and alloy products, which may limit the design of the pre-sintered mold to simple shapes and forms.

The use of additive manufacturing to produce bulk nanocrystalline alloy articles can present some of the same manufacturing challenges as stated above, such as loss of nanocrystalline structure due to melting and resolidification or undesirable grain growth due to sintering. In fact, the grain growth can be more susceptible in nanocrystalline alloys because the diffusion length is shorter to the grain boundary. Like other feedstock materials, the nanocrystalline alloy materials can also undergo physical transformation if and when subjected to the kind of energy influx and/or heating profile other feedstock materials are typically subjected to in additive manufacturing.

Systems and methods of an additive manufacturing process described herein can overcome some of the manufacturing challenges that plague existing technologies. Moreover, the additive manufacturing processes as described herein can use nanocrystalline alloy particles that have a lower sintering temperature to produce a monolithic microcrystalline or nanocrystalline alloy article. Examples of nanocrystalline alloy particles and materials, and methods of manufacturing thereof, are described in U.S. Patent Publication No. 2014/0271325 ("the '325 publication"), entitled "Sintered Nanocrystalline Alloys," filed Mar. 14, 2014, the entire contents of which are hereby incorporated by reference herein.

Nanocrystalline Materials

Nanocrystalline materials may generally refer to materials that comprise grains with a size in the nanometer range—i.e., smaller than about 1,000 nm: e.g., smaller than or equal to about 900 nm, about 800 nm, about 700 nm, about 600 nm, about 500 nm, about 400 nm, about 300 nm, about 200 nm, about 150 nm, about 100 nm, about 50 nm, about 30 nm, about 20 nm, about 10 nm, about 5 nm, about 2 nm, or smaller. In some embodiments, to further distinguish the different grain size regimes, the term "ultra-fine grain" is used to denote a grain size of greater than about 100 nm and less than about 1,000 nm and the term "nanocrystalline grain" is used to denote a grain size of less than or equal to about 100 nm. In some embodiments, the nanocrystalline material may be a polycrystalline material. In some embodiments, the nanocrystalline material may be a single crystalline material.

In some embodiments, the grain size may refer to the largest dimension of a grain. The dimension may refer to the diameter, length, width, or height of a grain, depending on the geometry thereof. In some embodiments, the grains may be spherical, cubic, conical, cylindrical, needle-like, or any other suitable geometry.

In some embodiments, the nanocrystalline material may be in the form of particulates. The shape of the particulates may be spherical, cubical, conical, cylindrical, needle-like, irregular, or any other suitable geometry.

In some embodiments, the nanocrystalline material may be a nanocrystalline alloy that may comprise a first metal material and a second metal material. The first and/or second metal material may comprise a first and/or second metal element, respectively. The term "element" herein refers to the chemical symbol that may be found in the Periodic Table. The first metal material may be a metal element. A metal element may include any of the elements in Groups 3-14 of the Periodic Table. In some embodiments, the metal element may be a refractory metal element. In some embodiments, the metal element is a transition metal (any of those in Groups 3-12 of the Periodic Table). While tungsten is employed to provide the description of several embodiments below, any suitable first metal material may be utilized in the place of tungsten. According some embodiments, the first metal material may comprise chromium. In some embodiments, the first metal material may comprise at least one of tungsten and chromium.

In some embodiments, the second metal material element may comprise, or be, an activator material, relative to the first metal material. In some embodiments, the second metal material may comprise, or be, a stabilizer material, relative to the first metal material. In some embodiments, the second metal material may comprise a metal element that is the same as, or different from, the first metal material. For example, in some embodiments, the metal element of the second metal material may be a transition metal. In some embodiments, the second metal material may comprise Cr, Ti, or both. According to other embodiments, the second metal material may comprise Ni.

The nanocrystalline material may have any value of relative density, depending on the material. Relative density may refer to the ratio between the experimentally measured density of the nanocrystalline material and the theoretical density of the nanocrystalline material.

In one embodiment, the nanocrystalline material may be a bulk nanocrystalline alloy. A bulk nanocrystalline alloy may be a material that is not in the form of a thin film. For example, a bulk nanocrystalline alloy in one embodiment may refer to a material with a smallest dimension of at least about 1 micron—e.g., at least about 10 microns, about 25 microns, about 50 microns, about 75 microns, about 100 microns, about 250 microns, about 500 microns, about 1 mm, about 5 mm, about 10 mm, or larger. In another embodiment, the nanocrystalline alloy is not in the form of a coating.

Stabilization of Nanocrystalline Structure

A nanocrystalline microstructure with a high surface-to-volume ratio may have a large number of interfacial regions or grain boundaries, which may make it unstable. In some embodiments, instability may indicate a high amount of excess energy in the system, and significant grain growth may be observed in pure nanostructured materials even at room temperature. Without being bound to any particular theory, this phenomenon may be understood from a thermodynamic viewpoint. The Gibbs free energy, G, is proportional to the grain boundary energy, $\gamma$, multiplied by grain boundary area, A. Therefore, the decrease in grain boundary area that occurs as a result of grain growth may bring the system into a lower energy state.

$$dG \alpha \gamma dA \qquad (1)$$

The high driving force for grain growth may limit further technological applications of pure nanostructured materials because even a small change in grain size over the service lifetime of the material may lead to a dramatic change in the material properties. Additionally, the propensity for grain growth may limit the amount of post-processing a nanostructured material may be subjected to, including consolidation and shape forming.

In some embodiments, two basic approaches may be used to stabilize nanocrystalline materials: a kinetic approach and a thermodynamic approach. The kinetic approach attempts to diminish grain boundary mobility to reduce grain growth. For example, grain boundary mobility may be limited by methods including second phase drag, solute drag, and chemical ordering. These strategies may postpone the time at which grain growth occurs. However, these methods may not reduce the driving force for grain growth. Thus, kinetically stabilized products may experience grain growth and may not provide constant performance throughout a service lifetime.

In contrast, the thermodynamic approach attempts to reduce the grain boundary energy by segregating solute atoms, thus reducing the driving force for grain growth. Without being bound to any particular theory, in alloy systems the grain boundary energy, $\gamma$, may be described in terms of the solute concentration, $c_s$, by the Gibbs adsorption equation:

$$\partial \gamma = -RT\Gamma_s \partial \ln c_s, \quad (2)$$

where T is temperature, R is the gas constant, and $\Gamma_s$ is the interfacial excess of the solute atoms. In the case of segregation, $\delta_s > 0$, and thus $\gamma$ will decrease with increasing solute concentration, $c_s$. A nanocrystalline alloy may be in a metastable state if $\gamma$ is close to zero at a specific solute concentration. From Equation (2), the total grain boundary energy is given by:

$$\gamma = \gamma_0 - \Gamma(\rightarrow H_{seg} + kT \ln X), \quad (3)$$

where $\gamma_0$ is the specific grain boundary energy of the pure element, $\Delta H_{seg}$ is the segregation enthalpy of solute atoms, k is the Boltzmann constant, and X is the solute concentration in the grain boundary. Stabilization of nanocrystalline material grain size by solute segregation may be conducted for Ni—P alloys, Y—Fe alloys, Nb—Cu alloys, Pd—Zr alloys, and Fe—Zr alloys, among many others.

In some embodiments, the curve depicting the degree of freedom to Gibbs free energy produced by solute segregation is different from the classical grain boundary energy curve, because it does not simply decrease but rather exhibits a minimum at a specific grain size. Thus, stabilized nanostructured materials with fine grain size may be produced by reducing the driving force for grain growth with solute segregation.

Nanocrystalline Tungsten

In some embodiments, nanocrystalline body-centered cubic metals may be desirable because these metals exhibit desirable properties, including localized shearing under high rate loading. The formation of shear bands under high rate loading may be beneficial for a material utilized in a kinetic energy penetrator device because it may allow more energy to be conveyed to the object to be penetrated by reducing the energy that is dissipated as a result of plastic deformation of the penetrator. In some embodiments, tungsten may be desirable as a prospective replacement for depleted uranium in kinetic energy penetrator applications because of its high density and strength. In addition, unlike tungsten with larger grain sizes, nanocrystalline tungsten may exhibit shear bands under high rate loading.

Two methodologies may be employed to manufacture nanocrystalline materials: bottom-up and top-down. The top-down strategy may refine a bulk coarse grain material into the nanoscale regime. The bottom-up method may employ nanosize particles followed by consolidation at high temperature.

One exemplary top-down method for refining the grain size of tungsten is severe plastic deformation (SPD). There are at least two typical SPD techniques: equal-channel-angular-pressing (ECAP) and high-pressure torsion (HPT). An ECAP process may result in a tungsten grain size of a few microns by initiating dynamic recrystallization and grain growth as a result of the high processing temperature of around 1,000° C. Therefore, a warm rolling process may follow an ECAP process to obtain a grain size in the ultra-fine grain regime. Another SPD processing method, HPT, applies high pressure and torsion to a disk of tungsten. The resulting plastic strain may yield a material with a grain size of about 100 nm. These SPD techniques may produce an ultra-fine grain size tungsten that may be perfectly plastic with no strain hardening, may exhibit a reduced strain rate sensitivity, and/or may exhibit localized shearing under high rate loading.

In some embodiments, problems may exist with the use of the SPD technique to produce ultra-fine grain size tungsten (or even finer grains). First, a large scale product is not produced through the SPD technique. In some embodiments, the SPD technique utilizes large amounts of energy per unit volume of material processed. Also, the fine grain size of the produced material may be lost if the material is subjected to subsequent processing (e.g., shape forming). Additionally, the SPD technique may not provide a scalable way to precisely control grain size, and thus may not produce a material with the specific grain size needed for a specific application. In one embodiment, the SPD technique does not reduce the driving force for grain growth.

In some embodiments of the bottom-up method, particles containing nanosize grains of the material may be synthesized, and then the particles may be consolidated. Thus, in some embodiments, this method herein may be referred to as a "two-step" process. The consolidation may be achieved by a sintering process. However, materials produced through the bottom-up method may exhibit poor ductility as a result of volume defects that are not removed during the consolidation step. These volume defects may include residual porosity, poor inter-particle bonding, and impurity contamination.

Bottom-up processes may be utilized to produce nanocrystalline tungsten. These processes may include the production of nanocrystalline tungsten powders synthesized through mechanical working, including ball milling and/or high energy milling. In some instances, although tungsten with nanosized grains of about 5 nm to about 15 nm may be produced, the resulting nanostructure may become unstable and may be susceptible to thermally activated grain growth. In some embodiments, to produce a tungsten material with a stable nanostructure, additive elements may be employed to reduce susceptibility to thermally activated grain growth. As described elsewhere herein, additive elements in some embodiments may be a stabilizer, an activator, or both, with respect to tungsten in the nanocrystalline alloy.

Elements for Stabilizing Nanocrystalline Tungsten

In selecting elements for stabilizing a tungsten material with nanosized grains, $\Delta H_{seg}$, may be important. Elements with a large value of $\Delta H_{seg}$ may reduce grain boundary energy. The $\Delta H_{seg}$ of a solution may be directly related to the elastic strain energy of the solution, and the elastic strain energy of a solution may scale with atomic radius mismatch.

Therefore, in some embodiments, as atomic radius mismatch increases, the grain boundary energy may be reduced.

The slope of excess enthalpy may become more negative as the ratio of the atomic radius of the solute to that of the host atom increases, indicating an increased potential for grain boundary energy reduction with increasing atomic radius mismatch. Other factors that may be considered in selecting an element for the stabilization of tungsten include chemical interaction and grain boundary energy difference. In the case of elements with a positive heat of mixing, solubility may be directly related to chemical interaction, and solutes with high immiscibility with host atoms may be more likely to segregate to grain boundaries.

In considering the segregation strength of tungsten alloys with positive heats of mixing, the elements Ti, V, Sc, and Cr may have good segregation strength with respect to their enthalpies of mixing. In some embodiments, vanadium exhibits a low heat of mixing, and thus may not be desirable for certain applications.

The thermal stability of an alloy may be determined and/or confirmed by any suitable techniques. For example, in some embodiments, the thermal stability of a W—Ti alloy may be confirmed with x-ray diffraction (XRD) data collected in situ at different temperatures. The alloy sample may already have been annealed at various temperatures, for various predetermined periods of time. While the grain size of pure tungsten may increase when annealed for 1.5 hours at 1,000° C., the grain size increase in a W-17.5 at. % Ti alloy may be suppressed. Therefore, not to be bound by any theory, but at least in some embodiments Ti may play a role in inhibiting grain growth by reducing the grain boundary energy.

Activated Sintering of Tungsten

Because tungsten has a high melting point of 3,422° C., tungsten may be employed as a refractory metal material. In some embodiments, even with sintering techniques, high temperatures of about 2,400° C. to about 2,800° C. may be needed to obtain a full density sintered tungsten material. Small amounts of additional elements may be added to tungsten to enhance the sintering kinetics, and in turn lower the sintering temperature. The additive elements may be metal elements, including any of those described herein. In some embodiments, the additive elements may be at least one of Pd, Pt, Ni, Co and Fe. These additive metal elements may surround the tungsten particles and provide a relatively high transport diffusion path for the tungsten, thereby reducing the activation energy of tungsten diffusion. In some embodiments, this technique is referred to as activated sintering.

Activated sintering may be explained by different mechanisms. It may be ascribed to dislocation climb, the transfer of electrons from the additive element to the d-orbital of tungsten, and an enhancement of the grain boundary diffusion rate. The effect of additive elements that are transition metal elements on the sintering kinetics of tungsten may be reflected by the degree of shrinkage of the tungsten compacts under a constant force at an elevated temperature, with shrinkage correlating to the amount of sintering that has occurred. In some embodiments, the use of Pd and Ni as additional elements may result in the activated sintering of tungsten. In some embodiments, the additive element Cu may have a minimal impact on the sintering kinetics and may result in the same linear shrinkage as pure tungsten. Not to be bound by any theory, but this may be a result of the low solubility of tungsten in Cu, which low solubility may prevent Cu from providing a fast transport path to tungsten atoms during sintering.

Sintering Kinetics

While additive elements may be desirable in some instances, too much of an additive element may hinder the densification of tungsten. Not to be bound by any particular theory, but this may suggest that activated sintering of tungsten may be a diffusion controlled process. The activation energies of the additive elements Fe, Co, Ni, and Pd, are 480 kJ/mol, 370 kJ/mol, 280 kJ/mol, and 200 kJ/mol, respectively.

The activation energy of pure tungsten sintering is about 380-460 kJ/mol. Not to be bound by any theory, but the value suggests that the mechanism of sintering of pure tungsten in the initial stage may be grain boundary diffusion because the activation energy of pure tungsten sintering is comparable to that of grain boundary diffusion of tungsten.

Activation Energy for Densification

Sintering may be a complex process that includes the change of microstructure as a result of several different diffusion mechanisms. In some embodiments, this complex sintering process may be distinguished into three stages based on the evolution of the microstructure: initial, intermediate and final stage. The initial stage may begin at a low temperature when necks are created between particles. The necks may be created through surface diffusion and may result in a small increase in density. The initial stage may correlate to less than 3% linear shrinkage. The intermediate stage may produce considerable densification. The densification in the intermediate stage may be up to a relative density of 93%. During the final stage, isolated pores may be formed and then removed. In the final stage, volume diffusion may be predominant.

The sintering behavior may be explained by geometric models. While these models may be in line with experimental results in some cases, slight deviations from the geometric models, such as the use of non-spherical particles or a variety of particle sizes, may make the results of the geometric models unreliable. Moreover, geometric models based on the initial sintering process may not be accurate beyond the first 5% of linear shrinkage. In addition, the actual evolution of the microstructure of powder compacts may be different from the predictions of geometric models. As a result, it may be difficult to quantitatively predict sintering kinetics.

The entire sintering process may be described in an approach that focuses on more than the three sintering stages. To evaluate the precise activation energy of the sintering process, a generalized sintering equation may be utilized. Not to be bound by any particular theory, but the instantaneous densification rate during sintering may be represented with temperature-dependent, grain-size-dependent, and density-dependent terms, as shown in Eq. (4).

$$\frac{d\rho}{dt} = A \frac{e^{-Q/RT}}{T} \frac{f(\rho)}{d^n} \text{ where } A = \frac{C\gamma V^{2/3}}{R}, \quad (4)$$

where $\rho$ is the bulk density, d is the grain or particle size, $\gamma$ is the surface energy, V is the molar volume, R is the gas constant, T is the absolute temperature, Q is the activation energy, and $f(\rho)$ is a function only of density. C is a constant and A is a material parameter that is not related to d, T, or $\rho$. Finally, the diffusion mechanism such as grain boundary diffusion or volume diffusion, determines the value of n. In isotropic shrinkage situations, $\rho$ may be obtained based on the simple mathematic relationship and the shrinkage data:

$$\rho(t) = \left(\frac{1}{1 + \Delta l/l_0}\right). \quad (5)$$

Upon taking the logarithm of Eq. 4, the following equation is obtained:

$$\ln\left(T\frac{d\rho}{dt}\right) = -\frac{Q}{RT} + \ln[f(\rho)] + \ln A - n\ln d. \quad (6)$$

Therefore, the activation energy, Q, may be evaluated through the slope by plotting ln (Tdρ/dt) versus 1/T at a constant ρ and d. Moreover, Equation (6) produces a different Q at different density values.

Thermodynamic Stabilization of Tungsten Alloys Through Segregation

In some embodiments, additive alloying elements may be employed: a stabilizer element and/or an activator element. The stabilizer element may thermodynamically stabilize nanocrystalline tungsten by segregation in the grain boundaries. This segregation may reduce the grain boundary energy, and in turn may reduce the driving force for grain growth. In some embodiments, the nanocrystalline tungsten alloy may be thermodynamically stable or substantially thermodynamically stable at temperatures greater than or equal to about 1,000° C.—e.g., greater than or equal to about 1,050° C., about 1,000° C., about 1,150° C., about 1,200° C., about 1,250° C., about 1,300° C., about 1,350° C., about 1,400° C., about 1,450° C., about 1,500° C., or higher.

The activator element may enhance the sintering kinetics of tungsten by providing a high diffusion path for tungsten atoms. As a result, the sintering temperature in one embodiment may be less than or equal to about 1,500° C.—e.g., less than or equal to about 1,450° C., about 1,400° C., about 1,350° C., about 1,300° C., about 1,250° C., about 1,200° C., about 1,150° C., about 1,100° C., about 1,050° C., or lower. In some embodiments, the sintering temperature may be about 1,000° C. The reduction of the sintering temperature may allow sintering to take place in the temperature range where the nanostructure of the nanocrystalline tungsten is thermodynamically stable. In some embodiments, the sintering temperature may be affected by the heating rate employed.

Stabilizer Elements

The stabilizer element may be any element capable of reducing the grain boundary energy of the sintered material, thereby reducing the driving force for grain growth. Generally, the stabilizer element may exhibit a positive heat of mixing with the sintered material. In some embodiments, the stabilizer element may be a metal element, which may be any of the aforedescribed metal elements.

The stabilizer element may be present in an amount of greater than or equal to about 2.5 at. %—e.g., greater than or equal to about 5 at. %, about 7.5 at. %, about 10 at. %, about 12.5 at. %, about 15 at. %, about 17.5 at. %, about 20 at. %, about 25 at. %, about 30 at. %, about 35 at. %, about 40 at. %, about 45 at. %, or greater. In some embodiments, the stabilizer element may be present in an amount of from about 2.5 at. % to about 45 at. %—e.g., about 5 at. % to about 40 at. %, about 7.5 at. % to about 35 at. %, about 10 at. % to about 30 at. %, about 12.5 at. % to about 25 at. %, or about 15 at. % to about 20 at. %, etc. In some embodiments, the stabilizer element may be present in an amount of about 2.5 at. %, about 5 at. %, about 7.5 at. %, about 10 at. %, about 12.5 at. %, about 15 at. %, about 17.5 at. %, about 20 at. %, about 25 at. %, about 30 at. %, about 35 at. %, about 40 at. %, or about 45 at. %.

Activator Elements

The activator element may be any element capable of enhancing the sintering kinetics of the sintered material. In some embodiments of activated sintering, the activator element may act as a fast carrier path for the diffusion of tungsten. As a result, in some embodiments the selection of an activator element may be based on two conditions. First, the solubility of the activator element in tungsten and segregation at the interparticle interfaces may be low. Additionally, the activator element should exhibit relatively high solubility for tungsten, allowing the activator element to act as a fast diffusion path for tungsten atoms. Second, the diffusion rate of tungsten in a phase rich in an activator element may be relatively high. Additionally, the diffusion rate of tungsten in an activator element rich phase should be higher than the diffusion rate of the tungsten in itself. The term "rich" with respect to the content of an element in a phase refers, in some embodiments, to a content of the element in the phase of at least about 50 at. %—e.g., at least about 60 at. %, about 70 at. %, about 80 at. %, about 90 at. %, about 99 at. %, or higher. The term "phase" in some embodiments refers to a state of matter. For example, in some embodiments, a phase may refer to a phase shown on a phase diagram.

In some embodiments, tungsten is soluble in the activator element. In other embodiments, the solubility of the tungsten in the activator element increases with increasing temperature. In some embodiments, the melting temperature of the activator element may be less than the melting temperature of the tungsten.

Generally, the amount of an activator may be minimized so that the quantity available for interaction with the stabilizer element is reduced. In some embodiments, the activator element may be present in an amount greater than or equal to about 0.15 at. %—e.g., greater than or equal to or about 0.3 at. %, about 0.5 at. %, about 1 at. %, about 3 at. %, about 5 at. %, about 8 at. %, about 10 at. %, about 13 at. %, about 15 at. %, about 18 at. %, about 20 at. %, about 23 at. %, about 25 at. %, about 30 at. %, about 35 at. %, about 40 at. %, about 45 at. %, or greater. In some embodiments, the activator element may be present in an amount of about 0.15 at. % to about 45 at. %—e.g., about 0.3 at. % to about 40 at. %, about 0.5 at. % to about 35 at. %, about 1 at. % to about 30 at. %, about 3 at. % to about 25 at. %, about 5 at. % to about 23 at. %, about 8 at. % to about 20 at. %, about 10 at. % to about 18 at. %, or about 13 at. % to about 15 at. %, etc. In some embodiments, the activator element may be present in an amount of about 0.15 at. %, about 0.3 at. %, about 0.5 at. %, about 1 at. %, about 3 at. %, about 5 at. %, about 8 at. %, about 10 at. %, about 13 at. %, about 15 at. %, about 18 at. %, about 20 at. %, about 23 at. %, about 25 at. %, about 30 at. %, about 35 at. %, about 40 at. %, or about 45 at. %.

In some embodiments, the activator element may be a metal element, which may be any of the aforedescribed metal elements. In some embodiments, the activator element may be at least one of Pd, Pt, Ni, Co, and Fe.

In some embodiments, the activator element may also be the stabilizer element. As shown in Eq. (3), the activator element that provides the largest $\Delta H_{seg}$ may produce the largest stabilization effect, and $\Delta H_{seg}$ may be related to three factors: atomic radius mismatch (elastic strain energy), chemical interaction and grain boundary energy difference. The atomic radius mismatch between Ni and tungsten is bigger than the mismatch between Pd and tungsten. Therefore, Ni may be a better element for stabilizing tungsten if only elastic strain energy is considered. In some embodiments, Ni or Pd may act as both the stabilizer element and the activator element, producing W—Ni and W—Pd nanocrystalline alloys.

In other embodiments, the stabilizer element may also be the activator element. The use of a single element both as the stabilizer and activator elements has the added benefit of removing the need to consider the interaction between the activator and the stabilizer. In some embodiments, the element that may be utilized as both the activator and stabilizer element may be a metal element, which may be any of the aforedescribed metal elements. In some embodiments, at least one of Ti, V, Cr, and Sc, or combinations thereof, may be utilized as both the activator and stabilizer element. In other embodiments, Cr, Ti, or both may be utilized as both the activator and stabilizer element.

In the case of both Ti and V, a solid solution is formed with tungsten at the sintering temperature (below 1,500° C.). In the case of Sc, the Sc and W, phases exist separately at the expected sintering temperature (below 1,500° C.). Thus, in some embodiments, the Sc may be able to provide a diffusion path for the tungsten. In the case of Cr, the Cr rich and W rich phases exist separately at the expected sintering temperature (below 1,500° C.). In addition, Cr has a relatively high segregation enthalpy compared to other stabilizers, and the diffusivity of tungsten in Cr is higher than the self-diffusivity of tungsten. In some embodiments, Cr may act as both the activator element and the stabilizer element, producing a W—Cr nanocrystalline alloy. In other words, in some embodiments, the nanocrystalline particles can remain solid throughout the sintering to form the metal alloy article.

Interaction of Activator and Stabilizer

When one element cannot act as both the stabilizer and the activator, two elements may be employed. The interaction between the two elements may be accounted for to ensure that the activator and stabilizer roles are properly fulfilled. For example, when the activator and the stabilizer form an intermetallic compound each of the elements may be prevented from fulfilling their designated role. As a result, activator and stabilizer combinations with the ability to form intermetallic compounds at the expected sintering temperatures should be avoided at least in some instances. The potential for the formation of intermetallic compounds between two elements may be analyzed with phase diagrams.

The amount of each additive may be important in determining the potential for the formation of an intermetallic phase based on the phase diagram. For example, 17.5 at. % Ti may be a desirable stabilizer with respect to W. In some embodiments, for simplicity an amount of 20 at. % stabilizer may be considered. On the other hand, the amount of an activator added may change with particle size. In some embodiments, although the exact amount of an activator to be added may not be known until measuring the distribution of the tungsten particle size, it may be roughly approximated as 0.5 wt. % compared to tungsten.

In some embodiments, wherein Ti and Ni in an amount of 20 at. % Ti and 1.3 at. % Ni (corresponding to 0.5 wt. % Ni compared to tungsten) are added, a $Ti_2Ni$ intermetallic phase and a Ti(HCP) phase coexist at temperatures below 767° C. More importantly for the purposes of activated sintering, a two phase region-Ti(HCP), liquid—exists at temperatures of about 1,200° C. and above, at this concentration.

In some embodiments, wherein Ti and Pd in an amount of 20 at. % Ti and 0.7 at. % Pd (corresponding to 0.5 wt. % Pd compared to tungsten) are added, a Ti(HCP) phase exists at about 1,500° C.

In some embodiments, wherein V and Ni in an amount of 20 at. % V and 1.3 at. % Ni (corresponding to 0.5 wt. % Ni compared to tungsten) are added, a $V_{3.1}Ni_{0.9}$ intermetallic compound and a V phase coexist at about 800° C., and a V phase exists at high temperature.

In some embodiments, wherein V and Pd in an amount of 20 at. % V and 0.7 at. % Pd (corresponding to 0.5 wt. % Pd compared to tungsten) are added, only a V phase exists up to about 1,900° C.

In some embodiments, wherein Cr and Pd in an amount of 20 at. % Cr and 0.7 at. % Pd (corresponding to 0.5 wt. % Pd compared to tungsten) are added, a Cr phase and a Pd phase coexist above 570° C., and a Cr phase and a liquid phase coexist above 1,304° C. Although a ternary diagram may be important in determining whether an intermetallic compound may be formed, the binary phase diagrams indicate that separate Cr and Pd phases may coexist. In some embodiments, the sintering temperature may be below 1,300° C., and Cr and the Pd exist in this temperature range as separate phases based on the binary phase diagrams, allowing Cr and Pd to fulfill the roles of a stabilizer and activator, respectively, without interference from each other. In other embodiments, the processing temperature may be above 1,300° C., and a liquid sintering technique may be employed.

In some embodiments, wherein Cr and Ni in an amount of 20 at. % Cr and 1.3 at. % Ni (corresponding to 0.5 wt. % Ni compared to tungsten) are added, a Cr phase and a Ni phase coexist above 587° C., and only the Cr phase exists above 1,000° C.

In some embodiments, wherein Sc and Pd in an amount of 20 at. % Sc and 0.7 at. % Pd (corresponding to 0.5 wt. % Pd compared to tungsten) are added, a Sc phase and a liquid phase coexist above 1,000° C., and only a liquid phase exists above 1,400° C.

In some embodiments, wherein Sc and Ni in an amount of 20 at. % Sc and 1.3 at. % Ni (corresponding to 0.5 wt. % Ni compared to tungsten) are added, a Sc phase and a liquid phase coexist above 960° C., and only the liquid phase exists above 1,400° C.

The ternary phase diagrams of the activator-stabilizer combination with tungsten indicate that a liquid phase may be formed with some stabilizer-activator combinations. In some embodiments, the stabilizer-activator combinations that may form a liquid phase may be Ni—Ti, Sc—Ni, Sc—Pd, and Cr—Pd.

The ternary phase diagram for W—Ti—Ni for 1,477° C. indicates that a liquid phase exists at the composition, W-20 at. % Ti-1.3 at. % Ni. In some embodiments, a liquid phase sintering technique may be employed for W—Ti—Ni, which may further enhance sintering kinetics like activated sintering.

Liquid Phase Sintering

In at least one embodiment of liquid phase sintering, the alloy contains more than one component above the solidus line of the components at the expected processing temperature, and a liquid phase is present at the expected processing temperature. The densification rate may be faster for liquid phase sintering, compared to solid state sintering, due to the high diffusivity of atoms in the liquid phase. Industrial sintering may generally be performed in the presence of a liquid phase due to cost and productivity advantages. Over 70% of sintered materials may be processed using liquid phase sintering techniques.

In some embodiments, a W—Ni—Fe alloy system may be sintered by liquid phase sintering techniques to produce a material employed in applications such as kinetic energy penetrators. A temperature above 1,460° C. may be applied for liquid phase sintering of 98 wt. % W-1 wt. % Ni-1 wt. % Fe. A liquid phase may emerge at this concentration combination of Ni and Fe. The low solubility of Ni and Fe in tungsten may aid tungsten powder sintering. This system may be similar to the W—Ni—Ti alloy system.

In some instances, liquid phase sintering techniques may exhibit concomitant microstructural coarsening. The inclusion of a stabilizer, such as Ti, in a nanocrystalline material may prevent microstructural coarsening. The occurrence of liquid phase sintering may be confirmed through scanning electron microscope (SEM) images at different temperatures throughout the sintering process. In some embodiments, the liquid phase sintering process may be the result of a pore filling mechanism. A pore filling mechanism and successful liquid phase sintering may be detected by the presence of liquid filled branches surrounding the sintered particles.

Production of Sintered Nanocrystalline Alloys

In some embodiments, a process for the production of a nanocrystalline alloy includes sintering a plurality of nanocrystalline particulates. The nanocrystalline particulates may include a first metal material, such as tungsten, and a second metal material, such as an activator element. The nanocrystalline particulates may include a non-equilibrium phase where the second metal material is dissolved in the first metal material. According to some embodiments, the non-equilibrium phase may be a supersaturated phase. The term "supersaturated phase" is described further below. The non-equilibrium phase may undergo decomposition during the sintering of the nanocrystalline particulates. The sintering of the nanocrystalline particulates may cause the formation of a phase rich in the second metal material at at least one of the surface and grain boundaries of the nanocrystalline particulates. The formation of the phase rich in the second metal material may be the result of the decomposition of the non-equilibrium phase during the sintering. The phase rich in the second metal material may act as a fast diffusion path for the first metal material, enhancing the sintering kinetics and accelerating the rate of sintering of the nanocrystalline particulates. According to some embodiments, the decomposition of the non-equilibrium phase during the sintering of the nanocrystalline particulates accelerates the rate of sintering of the nanocrystalline particulates. The nanocrystalline alloy produced as a result of the sintering process may be a bulk nanocrystalline alloy.

In some embodiments, the second metal material may have a lower melting temperature than the first metal material. In other embodiments, the first metal material may be soluble in the second metal material. In some embodiments, the solubility of the first metal material in the second metal material may increase with increasing temperature. In other embodiments, the diffusivity of the first metal material in a phase rich in the second metal material is greater than the diffusivity of the first metal material in itself. Specifically, the first metal material and second metal material may include the elements described above in the Nanocrystalline Alloy section.

In some embodiments, the sintered nanocrystalline alloy may exhibit a relative density of greater than or equal to about 75%—e.g., at least about 80%, about 85%, about 90%, about 91%, about 92%, about 93%, about 94%, about 95%, about 96%, about 97%, about 98%, about 99%, or about 99.9%. The term "relative density" is already described above. In some embodiments, the relative density of the sintered material may be about 100%. According to at least one embodiment, the sintered material may be fully dense. As utilized herein, the term "fully dense" or "full density" refers to a material with a relative density of at least 98%—e.g., at least about 98%, about 99%, about 99.5%, or higher. The density of the sintered material may impact other material properties of the sintered material. Thus, by controlling the density of the sintered material the other material properties may be controlled.

In some embodiments, the grain size of the sintered nanocrystalline alloy may be in the nanometer range—e.g., smaller than or equal to about 1,000 nm: e.g., less than or equal to about 900 nm, about 800 nm, about 700 nm, about 600 nm, about 500 nm, about 450 nm, about 400 nm, about 350 nm, about 300 nm, about 250 nm, about 200 nm, about 150 nm, about 125 nm, about 100 nm, about 75 nm, about 50 nm, about 40 nm, about 30 nm, about 25 nm, about 20 nm, about 15 nm, about 10 nm, or smaller. In some embodiments herein, to further distinguish the different grain size regimes, the term "ultra-fine grain" is used to denote a grain size of greater than about 100 nm and less than about 1,000 nm and the term "nanocrystalline grain" is used to denote a grain size of less than or equal to about 100 nm. In some embodiments, the grain size of the sintered nanocrystalline alloy may be about 1 nm to about 1,000 nm—e.g., about 10 nm to about 900 nm, about 15 nm to about 800 nm, about 20 nm to about 700 nm, about 25 nm to about 600 nm, about 30 nm to about 500 nm, about 40 nm to about 450 nm, about 50 nm to about 400 nm, about 75 nm to about 350 nm, about 100 nm to about 300 nm, about 125 nm to about 250 nm, or about 150 nm to about 200 nm, etc. In some embodiments, the grain size of the sintered nanocrystalline alloy may be smaller than the grain size of a sintered material that includes the first metal material in the absence of the second metal material. In some embodiments, the grain size of the sintered nanocrystalline alloy may be about the same as the grain size of a sintered material that includes the first metal material in the absence of the second metal material. In some embodiments, the grain size of the sintered nanocrystalline alloy may be larger than or the same as the grain size of a sintered material that includes the first metal material in the absence of the second metal material. In some embodiments, the sintering mechanism described herein may be useful for the production of ultra-fine and nanocrystalline sintered materials due to the ability of second phases and alloying elements to maintain ultra-fine and nanocrystalline structures during heat treatment.

The sintering conditions for the production of the sintered material may be any appropriate conditions. According to some embodiments, a high sintering temperature may be employed for a short sintering time to produce the sintered material. Alternatively, a comparably lower sintering temperature may be employed for a longer sintering time to produce a sintered material that is densified to the same degree. In some embodiments, extended sintering times may result in an undesired increase in grain size. The sintering may be a pressureless sintering process. The sintering mechanism described herein allows the production of fully dense sintered ultra-fine and nanocrystalline materials even in the absence of external pressure applied during the sintering process.

Process for Making Nanocrystalline Particulates

Some embodiments provide a method for making nanocrystalline tungsten particulates, which method involves mechanically working a powder including a plurality of tungsten particulates and a second metal material. In some embodiments, the second metal material may be an activator element or a stabilizer element. The mechanical working may be a ball-milling process or a high-energy ball milling process. In an exemplary ball-milling process, a tungsten carbide or steel milling vial may be employed, with a ball-to-powder ratio of about 2:1 to about 5:1, and a steric acid process control agent content of about 0.01 wt. % to about 3 wt. %. In other embodiments, the mechanical working may be carried out in the presence of a steric acid process control agent content of about 1 wt. %, about 2 wt. %, or about 3 wt. %. According to other embodiments, the mechanical working is carried out in the absence of a process control agent. In some embodiments, the ball milling may be performed under any conditions sufficient to produce a nanocrystalline particulate comprising a supersaturated phase.

According to other embodiments, any appropriate method of mechanical powder milling may be employed to mechanically work a powder and form nanocrystalline particulates. In some embodiments, a high-energy ball mill of attritor mill may be employed. In other embodiments, other types of mills may be employed, including shaker mills and planetary mills. In general, any mechanical milling method that produces a mechanical alloying effect may be employed.

The average grain size of the nanocrystalline particulates may be calculated by peak broadening measurements obtained through x-ray diffraction (XRD). The change in XRD patterns may be a function of milling time. In some embodiments, peaks in the XRD patterns may start to be broadened after a milling time of about 6 hours. The grain size of the milled material may also significantly drop after a milling time of about 6 hours.

In some embodiments, the ball milling may be conducted for a time of greater than or equal to about 2 hours—e.g., greater than or equal to about 4 hours, about 6 hours, about 8 hours, about 10 hours, about 12 hours, about 15 hours, about 20 hours, about 25 hours, about 30 hours, or about 35 hours. In some embodiments, the ball-milling may be conducted for a time of about 1 hour to about 35 hours—e.g., about 2 hours to about 30 hours, about 4 hours to about 25 hours, about 6 hours to about 20 hours, about 8 hours to about 15 hours, or about 10 hours to about 12 hours. If the milling time is too long, the tungsten powder may be contaminated by the milling vial material. The amount of the second metal material that is dissolved in the tungsten material may also increase with increasing milling time. In some embodiments, after the ball-milling step, a phase rich in the second metal material may be observed.

In some embodiments, the grain size of the produced nanocrystalline particulates may be smaller than about 1,000 nm—e.g., smaller than or equal to about 900 nm, about 800 nm, about 700 nm, about 600 nm, about 500 nm, about 400 nm, about 300 nm, about 200 nm, about 150 nm, about 100 nm, about 50 nm, about 30 nm, about 20 nm, about 10 nm, about 5 nm, about 2 nm, or smaller. In some embodiments, the grain size of the produced nanocrystalline particulates may be about 1 nm to about 1,000 nm—e.g., about 10 nm to about 900 nm, about 15 nm to about 800 nm, about 20 nm to about 700 nm, about 25 nm to about 600 nm, about 30 nm to about 500 nm, about 40 nm to about 450 nm, about 50 nm to about 400 nm, about 75 nm to about 350 nm, about 100 nm to about 300 nm, about 125 nm to about 250 nm, or about 150 nm to about 200 nm, etc. In other embodiments, the nanocrystalline particulates may have a grain size of about 7 nm to about 8 nm.

In some embodiments, the nanocrystalline particulates are polycrystalline—e.g., the nanocrystalline particulates contain a plurality of grains. In other embodiments, the nanocrystalline particulates are single crystalline materials—e.g., at least one of the nanocrystalline particulates contains a single grain.

In at least one embodiment, ball-milling of the tungsten powder and the activator element may produce a non-equilibrium phase. The non-equilibrium phase may contain a solid solution. The non-equilibrium phase may be a supersaturated phase. A "supersaturated phase" may be a non-equilibrium phase that includes the activator element forcibly dissolved in the tungsten in an amount that exceeds the amount of activator element that could be otherwise dissolved in an equilibrium tungsten phase. In some embodiments, the supersaturated phase may be the only phase present after the ball-milling process. In other embodiments, a second phase rich in the activator element may be present after ball milling.

In at least one embodiment, the sintering behavior of the particulate material may be observed by heating a compact of the particulate material under a constant force. A change in the length of the compact indicates sintering and densification. The force may be of any value, depending on the application. In some embodiments, the constant force applied to the compact throughout the heating process is about 0.05N or about 0.1N. The sintering temperature of the particulate material may be defined as the temperature at which the change in the length of the compact is 1%. According to some embodiments, the sintering may include a liquid phase sintering mechanism.

Additive Manufacturing

In some embodiments, the systems and methods described herein can include a binder that is mixed with nanocrystalline alloy particles, and the mixture of the particles and the binder can enable a finer control of materials properties and quality of the additively manufactured product. Said another way, the nanostructure or microstructure of the final product as well as the porosity of the final product can be better controlled using the systems and methods of the additive manufacturing process as described herein. As described herein, nanocrystalline particles can be formed into a green body using an additive manufacturing process, which can then be may be sintered in a separate step via the technique as described in the '325 publication to produce nanocrystalline or microcrystalline alloy articles. In some embodiments, there is no binder used in creating in a green body. In some embodiments, the particles are sintered as they are disposed or deposited and there is no intermediate green body formed.

In some embodiments, the systems and methods as described herein for creating a nanocrystalline or microcrystalline metal alloy article include disposing a plurality of nanocrystalline particles and selectively binding the particles together to form a green body. The green body is then sintered at a sintering temperature to form a monolithic alloy article. In some embodiments, disposing the plurality of nanocrystalline particles and sintering can be done together in a single step to form the monolithic microcrystalline or nanocrystalline alloy article. Said another way, any additive manufacturing that utilizes a laser or e-beam sintering process may be possible to continuously sinter new powders being applied to the final part.

The systems and methods as described herein can be used to produce additive manufacturing fabricated parts without any of the aforementioned limitations currently preventing additive manufacturing of metals and alloys from industrial-wide mass adoption. By using a mixture of nanocrystalline alloy particles and a binder, a green body of the mixture material can be additively manufactured. The green body produced can be free of any complex thermal history associated with, or conventionally subjected to by, a traditional additive manufacturing system. This enables creating a near net shape of a product in the green body, which is ready to be sintered to form a dense and substantially void-free three-dimensional structure, which otherwise can be difficult to obtain with a traditional additive manufacturing process. Further, these particles can generally be sintered to full or near full density at lower temperature, in less time, and/or at reduced pressures relative to traditional powder metallurgy processing providing further benefits in process efficiency and shape complexity.

As used in this specification, the singular forms "a," "an" and "the" include plural referents unless the context clearly dictates otherwise. Thus, for example, the term "a member" is intended to mean a single member or a combination of members, "a material" is intended to mean one or more materials, or a combination thereof.

As used herein, the term "additive manufacturing" refers to various processes by which digital three-dimensional design data is used to build up a component in layers by depositing material including, for example, direct digital manufacturing, free form fabrication, and 3D printing.

As used herein, the term "green body" refers to an object whose main constituent is a weakly bound material, usually in the form of bonded powder before it has been sintered or fired. When using a binder, the term green body can similarly refer to a weakly bound binder network that can substantially form a metal and/or metal alloy material and a binder into a three-dimensional shape or object.

As used herein, the term "about" and "approximately" generally mean plus or minus 10% of the value stated, for example about 250 μm would include 225 μm to 275 μm, and approximately 1,000 μm would include 900 μm to 1,100 μm.

As used herein, the term "microcrystalline" generally refers to a volume average grain size greater than 1 μm.

As used herein, the term "nanocrystalline" generally refers to a volume average grain size less than 1 μm, less than or equal to about 900 nm, about 800 nm, about 700 nm, about 600 nm, about 500 nm, about 400 nm, about 300 nm, about 200 nm, about 150 nm, about 100 nm, about 50 nm, about 30 nm, about 20 nm, about 10 nm, about 5 nm, about 2 nm, or smaller.

As used herein, the term "ultra-fine grain" is used to denote a grain size of greater than about 100 nm and less than about 1,000 nm.

As used herein, the term "nanocrystalline grain" is used to denote a grain size of less than or equal to about 100 nm.

In some embodiments, the nanocrystalline material may be a polycrystalline material. In some embodiments, the nanocrystalline material may be a single crystalline material.

In some embodiments, the grain size may refer to the largest dimension of a grain. The dimension may refer to the diameter, length, width, or height of a grain, depending on the geometry thereof. In some embodiments, the grains may be spherical, cubic, conical, cylindrical, needle-like, or any other suitable geometry.

In some embodiments, the nanocrystalline material may be in the form of particles. The shape of the particles may be spherical, cubical, conical, cylindrical, needlelike, irregular, or any other suitable geometry.

FIG. 1 shows a schematic block diagram of a structure 120, according to an embodiment. The structure 120 can include a plurality of nanocrystalline alloy particles 140, and optionally, a binder 160. Although referred to herein as the nanocrystalline alloy particles 140, microcrystalline alloy particles can also be used. The nanocrystalline alloy particles 140 can be formed into the structure 120 via an additive manufacturing process. With the use of the optional binder 160, the nanocrystalline alloy particles 140 and the binder 160 can be mixed to form an intermediate material, which can be formed into the structure 120 via an additive manufacturing process. The structure 120 can be a green body that can be sintered at a later time.

In some embodiments, the structure 120 can be formed via any additive manufacturing techniques as described herein. In some embodiments, the structure 120 can be in any shape or form. In some embodiments, the structure 120 can be a two-dimensional object. In some embodiments, the structure 120 can be a three-dimensional structure. In some embodiments, the structure 120 can be similar or substantially similar to any structure produced by any conventional ceramic processing techniques or metal processing techniques.

In some embodiments, the structure 120 can be substantially free of voids. In some embodiments, the structure 120 can be a highly complex geometrical structure, which cannot be produced by any conventional green body processing or preparation techniques.

In some embodiments, the structure 120 can be of any physical dimension. In some embodiments, the structure 120 can have a volume of about 0.01 $m^3$, about 0.02 $m^3$, about 0.03 $m^3$, about 0.04 $m^3$, about 0.05 $m^3$, about 0.06 $m^3$, about 0.07 $m^3$, about 0.08 $m^3$, about 0.09 $m^3$, about 0.10 $m^3$, about 0.15 $m^3$, about 0.20 $m^3$, about 0.25 $m^3$, about 0.30 $m^3$, about 0.35 $m^3$, about 0.40 $m^3$, about 0.45 $m^3$, about 0.50 $m^3$, about 0.55 $m^3$, about 0.60 $m^3$, about 0.65 $m^3$, about 0.70 $m^3$, about 0.75 $m^3$, about 0.80 $m^3$, about 0.85 $m^3$, about 0.90 $m^3$, about 0.95 $m^3$, about 1.0 $m^3$, about 1.1 $m^3$, about 1.2 $m^3$, about 1.3 $m^3$, about 1.4 $m^3$, about 1.5 $m^3$, about 1.6 $m^3$, about 1.7 $m^3$, about 1.8 $m^3$, about 1.9 $m^3$, about 2.0 $m^3$, about 2.2 $m^3$, about 2.4 $m^3$, about 2.6 $m^3$, about 2.8 $m^3$, about 3.0 $m^3$, about 3.5 $m^3$, about 4.0 $m^3$, about 4.5 $m^3$, about 5.0 $m^3$, about 5.5 $m^3$, about 6.0 $m^3$, about 6.5 $m^3$, about 7.0 $m^3$, about 7.5 $m^3$, about 8.0 $m^3$, about 8.5 $m^3$, about 9.0 $m^3$, about 9.5 $m^3$, or about 10.0 $m^3$, inclusive of all ranges therebetween.

In some embodiments, the nanocrystalline alloy particles 140 can comprise a metal alloy (e.g., a nanocrystalline alloy). In some embodiments, the nanocrystalline alloy particles 140 can comprise a metal alloy (e.g., a microcrystalline alloy). In some embodiments, the nanocrystalline alloy particles 140 can be a binary alloy. In some embodiments, the nanocrystalline alloy particles 140 can be a ternary alloy. In some embodiments, the nanocrystalline alloy particles 140 can be a quaternary alloy. In some embodiments, the nanocrystalline alloy particles 140 can be a quinary alloy, senary alloy or septenary alloy. In some embodiments, the nanocrystalline alloy particles 140 can be obtained via mixing a metal with another metal. In some embodiments, the nanocrystalline alloy particles can be obtained via mixing a first plurality of particles comprising a first metal with a second plurality of particles comprising a second (different) metal. In some embodiments, a plurality of particles comprising more than one metal (e.g., alloy) can be mixed with a plurality of particles comprising a different metal or a different alloy. In some embodiments, a plurality of particles comprising more than one metal (e.g., alloy) can be mixed with a plurality of particles comprising a ceramic material. In some embodiments, a plurality of particles comprising more than one metal (e.g., alloy) can be mixed with a plurality of particles comprising a lubricant material. In some embodiments, two or more metals can be alloyed to form a plurality of nanocrystalline alloy particles comprising a multi-elemental composition. Examples of nanocrystalline alloy particles and materials, and methods of manufacturing thereof, are described in the '325 publication.

In some embodiments, the nanocrystalline alloy particles 140 can include, but are not limited to any of the following metals including tungsten, chromium, copper, molybdenum, palladium, platinum, nickel, cobalt, iron, titanium, vanadium, aluminum, manganese, tantalum, beryllium, bismuth, hafnium, iridium, lanthanum, magnesium, niobium, osmium, silicon, tin, yttrium, zinc, zirconium, and scandium.

In some embodiments, the atomic percentage (at. %) of an individual constituent metal in the nanocrystalline alloy particles 140 can be from 0.01 at. % to 99.99 at. %, from 0.05 at. % to 99.95 at. %, from 0.1 at. % to 99.9 at. %, from 0.5 at. % to 99.5 at. %, from 1 at. % to 99 at. %, from 2 at. % to 98 at. %, from 5 at. % to 95 at. %, from 10 at. % to 90 at. %, from 15 at. % to 85 at. %, from 20 at. % to 80 at. %, from 25 at. % to 75 at. %, from 30 at. % to 70 at. %, from 35 at. % to 65 at. %, from 40 at. % to 60 at. %, and from 45 at. % to 55 at. %, inclusive of all atomic percentage ranges therebetween.

In some embodiments, the average crystalline grain size of the nanocrystalline alloy particles 140 can be about 1 nm, about 2 nm, about 3 nm, about 4 nm, about 5 nm, about 6 nm, about 7 nm, about 8 nm, about 9 nm, about 10 nm, about 15 nm, about 20 nm, about 25 nm, about 30 nm, about 35 nm, about 40 nm, about 45 nm, about 50 nm, about 55 nm, about 60 nm, about 65 nm, about 70 nm, about 75 nm, about 80 nm, about 85 nm, about 90 nm, about 95 nm, about 100 nm, about 110 nm, about 120 nm, about 130 nm, about 140 nm, about 150 nm, about 160 nm, about 170 nm, about 180 nm, about 190 nm, about 200 nm, about 220 nm, about 240 nm, about 260 nm, about 280 nm, about 300 nm, about 350 nm, about 400 nm, about 450 nm, about 500 nm, about 550 nm, about 600 nm, about 650 nm, about 700 nm, about 750 nm, about 800 nm, about 850 nm, about 900 nm, about 950 nm, about 1,000 nm or any combination or ranges of sizes thereof. In some embodiments, the crystalline grain size distribution of the nanocrystalline alloy particles 140 can be any crystalline grain size distribution. In some embodiments, there is a broad crystalline grain size distribution of the nanocrystalline alloy particles 140. In some embodiments, there is a narrow crystalline grain size distribution of the nanocrystalline alloy particles 140.

In some embodiments, the average particle size of the nanocrystalline alloy particles 140 can be about 5 nm, about 8 nm, about 10 nm, about 15 nm, about 20 nm, about 25 nm, about 30 nm, about 35 nm, about 40 nm, about 45 nm, about 50 nm, about 55 nm, about 60 nm, about 65 nm, about 70 nm, about 75 nm, about 80 nm, about 85 nm, about 90 nm, about 95 nm, about 100 nm, about 110 nm, about 120 nm, about 130 nm, about 140 nm, about 150 nm, about 160 nm, about 170 nm, about 180 nm, about 190 nm, about 200 nm, about 220 nm, about 240 nm, about 260 nm, about 280 nm, about 300 nm, about 350 nm, about 400 nm, about 450 nm, about 500 nm, about 550 nm, about 600 nm, about 650 nm, about 700 nm, about 750 nm, about 800 nm, about 850 nm, about 900 nm, about 950 nm, about 1 µm, about 1.5 µm, about 2.0 µm, about 2.5 µm, about 3.0 µm, about 3.5 µm, about 4.0 µm, about 4.5 µm, about 5.0 µm, about 5.5 µm, about 6.0 µm, about 6.5 µm, about 7.0 µm, about 7.5 µm, about 8.0 µm, about 8.5 µm, about 9.0 µm, about 9.5 µm, about 10 µm, about 11 µm, about 12 µm, about 13 µm, about 14 µm, about 15 µm, about 16 µm, about 17 µm, about 18 µm, about 19 µm, about 20 µm, about 22 µm, about 24 µm, about 26 µm, about 28 µm, about 30 µm, about 35 µm, about 40 µm, about 45 µm, about 50 µm, about 55 µm, about 60 µm, about 65 µm, about 70 µm, about 75 µm, about 80 µm, about 85 µm, about 90 µm, about 95 µm, about 100 µm, about 110 µm, about 120 µm, about 130 µm, about 140 µm, about 150 µm, about 160 µm, about 170 µm, about 180 µm, about 190 µm, about 200 µm, about 220 µm, about 240 µm, about 260 µm, about 280 µm, about 300 µm, about 350 µm, about 400 µm, about 450 µm, about 500 µm, about 550 µm, about 600 µm, about 650 µm, about 700 µm, about 750 µm, about 800 µm, about 850 µm, about 900 µm, about 950 µm, about 1,000 µm or any combination or range of sizes thereof. In some embodiments, the particle size distribution of the nanocrystalline alloy particles 140 can be any particle size distribution. In some embodiments, there is a broad particle size distribution of the nanocrystalline alloy particles 140. In some embodiments, there is a narrow particle size distribution of the nanocrystalline alloy particles 140.

In some embodiments, the grains of the nanocrystalline alloy particles 140 can be equiaxed or substantially equiaxed. In some embodiments, the nanocrystalline alloy particles 140 can be equiaxed or substantially equiaxed. In some embodiments, the nanocrystalline alloy particles 140 can be columnar, spherical, oval, conical, cylindrical, cubic, or any polygon with multiple facet or any other shapes or forms.

In some embodiments, the binder 160 can be solid. In some embodiments, the binder 160 can be semi-solid. In some embodiments, the binder 160 can be gel. In some embodiments, the binder 160 can be paste. In some embodiments, the binder 160 can be wax or a waxy solid, such as stearic acid. In some embodiments, the binder 160 can be liquid. In some embodiments, the binder 160 can be a liquid with a high viscosity. In some embodiments, the binder 160 can be a liquid with a low viscosity. In some embodiments, the binder 160 can have a high vapor pressure. In some embodiments, the binder 160 can have a low vapor pressure. In some embodiments, the binder 160 can have a relatively high volatilization temperature. In some embodiments, the binder 160 can have a relatively low volatilization temperature.

In some embodiments, the binder 160 can be a coating. In some embodiments, the coating can cover a relatively small percentage of the surface of the nanocrystalline alloy particle 140. In some embodiments, the coating can substantially or completely cover the surface of the nanocrystalline alloy particles 140. The coating of the binder 160 can comprise a polymer, a wax, gel, and any organic materials and a combination thereof. The coating can have a relatively low melting temperature. The coating can have a lower melting temperature than the melting temperature of the nanocrystalline alloy particles 140.

In some embodiments, the coating of the binder 160 can include inorganic materials. The inorganic coating can include coating of any metal or metal alloy. Such metal can include aluminum, indium, and any low melting metal or alloy. The metal or alloy coating can have a lower melting temperature than the melting temperature of the nanocrystalline alloy particles 140.

In some embodiments, the binder 160 can be particles of average dimensions of about 1 nm, about 2 nm, about 3 nm, about 4 nm, about 5 nm, about 6 nm, about 7 nm, about 8 nm, about 9 nm, about 10 nm, about 15 nm, about 20 nm, about 25 nm, about 30 nm, about 35 nm, about 40 nm, about 45 nm, about 50 nm, about 55 nm, about 60 nm, about 65 nm, about 70 nm, about 75 nm, about 80 nm, about 85 nm, about 90 nm, about 95 nm, about 100 nm, about 110 nm, about 120 nm, about 130 nm, about 140 nm, about 150 nm, about 160 nm, about 170 nm, about 180 nm, about 190 nm, about 200 nm, about 220 nm, about 240 nm, about 260 nm, about 280 nm, about 300 nm, about 350 nm, about 400 nm, about 450 nm, about 500 nm, about 550 nm, about 600 nm, about 650 nm, about 700 nm, about 750 nm, about 800 nm, about 850 nm, about 900 nm, about 950 nm, about 1,000 nm or any combination of sizes or ranges thereof. In some embodiments, the particle size distribution of the binder 160 can be any particle size distribution. In some embodiments, there is a broad particle size distribution of the binder 160. In some embodiments, there is a narrow particle size distribution of the binder 160.

In some embodiments, the binder 160 can be equiaxed or substantially equiaxed, columnar, spherical, oval, conical, cylindrical, cubic, or any polygon with multiple facet or any other shapes or forms. In some embodiments, the binder 160 can be a chain of binder particles. In some embodiments, the binder 160 can be a network of binder particles.

Figure 2:
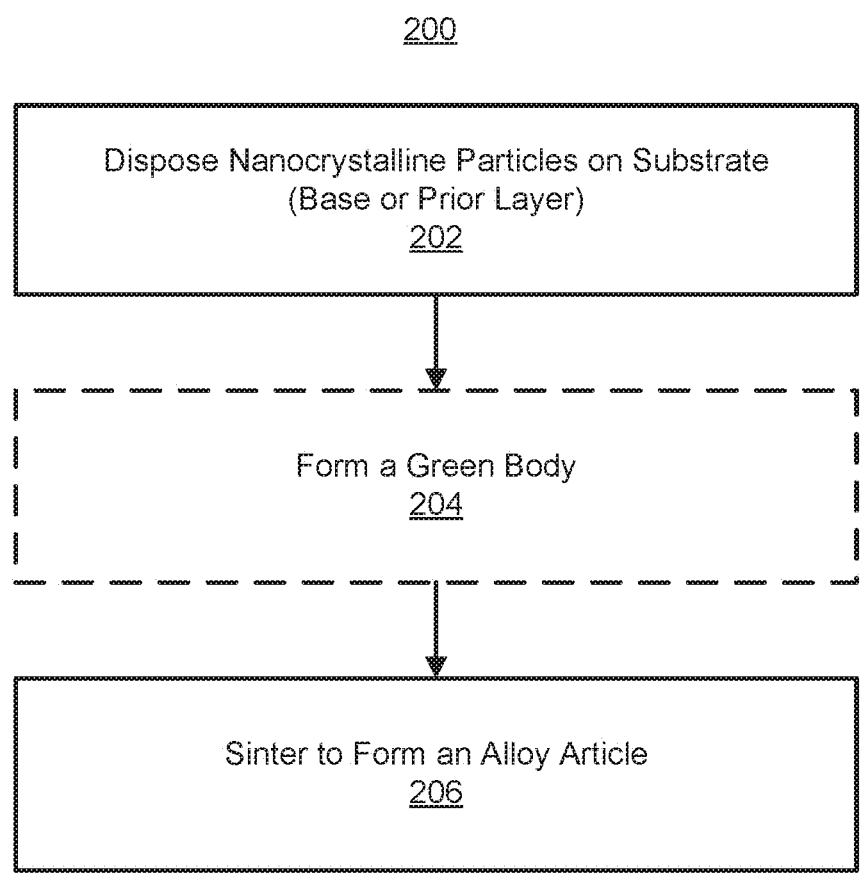
FIG. 2 shows a process flow diagram for creating a nanocrystalline (and/or microcrystalline) alloy article using additive manufacturing, according to an embodiment.

FIG. 2 shows a process flow diagram describing a manufacturing method 200 for producing a nanocrystalline (or microcrystalline) alloy article using additive manufacturing, according to an embodiment. The manufacturing method 200 includes disposing a plurality of nanocrystalline alloy particles on a substrate, at step 202. The nanocrystalline alloy particles can be any of the nanocrystalline (microcrystalline) alloy particles 140 described above with reference to FIG. 1. Therefore, the nanocrystalline alloy particles are not described in further detail herein, and should be considered identical or substantially similar to the nanocrystalline alloy particles 140 unless explicitly described differently. In some embodiments, the substrate can be a substantially planar base. In some embodiments, the substrate can be a prior layer that was formed during the additive manufacturing process. Said another way, a first layer can be disposed on a base, and then a second layer can be disposed on at least a portion of the first layer, and so on.

After disposing the nanocrystalline alloy particles, a green body can optionally be formed, at step 204. In some embodiments, the method of forming the green body can include any of the additive manufacturing techniques as described herein. In some embodiments, the additive manufacturing technique can be a powder bed system. In some embodiments, the additive manufacturing technique can be a powder feed system. In some embodiments, the additive manufacturing used to form the green body may include heating the mixture of the nanocrystalline alloy particles to a certain temperature to selectively sinter so as to cause a minimal sintering to hold the green body intact (e.g., partially sintered). In some embodiments, the partially sintered green body can maintain its shape and form so as to be fully sintered at a later time. In some embodiments, the sintering can be caused by the use of an electron beam, a high power laser beam or a plasma transferred arc beam. In some embodiments, the sintering is sufficiently low enough that full sintering the nanocrystalline alloy particles can be substantially prevented. In some embodiments, the additive manufacturing used to form the green body may include 3D inkjet-like printer systems.

Once a green body is formed, the green body can be sintered to form a nanocrystalline alloy article, at step 206. The sintering of the green body can be processed via any conventional sintering techniques. Examples of such sintering techniques are described in the '325 publication.

In some embodiments, step 202 and step 206 can take place in a single step in which the disposing and sintering of the nanocrystalline alloy particles take place substantially in the same step. Said another way, the nanocrystalline alloy particles are sintered as they are being disposed.

In some embodiments, the bulk nanocrystalline alloy is substantially free of voids. In some cases voids may comprise less than 20% of the volume, less than 15%, less than 10%, less than 9%, less than 8%, less than 7%, less than 6%, less than 5%, less than 4%, less than 3%, less than 2%, less than 1%, less than 0.5%, less than 0.25%, less than 0.1%, less than 0.05%, or any combination of percentages or ranges thereof. In some embodiments, the nanocrystalline alloy article can be substantially free of defects. In some embodiments, the nanocrystalline alloy article has a nanostructure or microstructure that is substantially similar to the nanostructure or microstructure of the nanocrystalline alloy particles before sintering. Said another way, the nanostructure or microstructure remains substantially unchanged and a minimal grain growth is observed. Structural comparison between the nanocrystalline alloy particles and the nanocrystalline alloy article after sintering shows that the crystalline grain size is substantially maintained in certain alloy systems. Examples of such alloy systems may include tungsten-chromium, tungsten-nickel, tungsten-copper, and many tungsten-based alloys, including binary, ternary, quaternary, and the likes. Other examples of such alloy systems may include chromium-based alloys. Other examples of such alloy systems may include alloys based on copper, molybdenum, palladium, platinum, nickel, cobalt, iron, titanium, vanadium, aluminum, manganese, tantalum, beryllium, bismuth, hafnium, iridium, lanthanum, magnesium, niobium, osmium, silicon, tin, yttrium, zinc, zirconium or scandium. In some embodiments, exemplary alloy systems that substantially maintain the grain size or that substantially resist microstructure evolution due to an external cause (e.g., heating from an electron beam, a high power laser beam, or a plasma transferred arc system) are described in the '325 publication.

Figure 3:
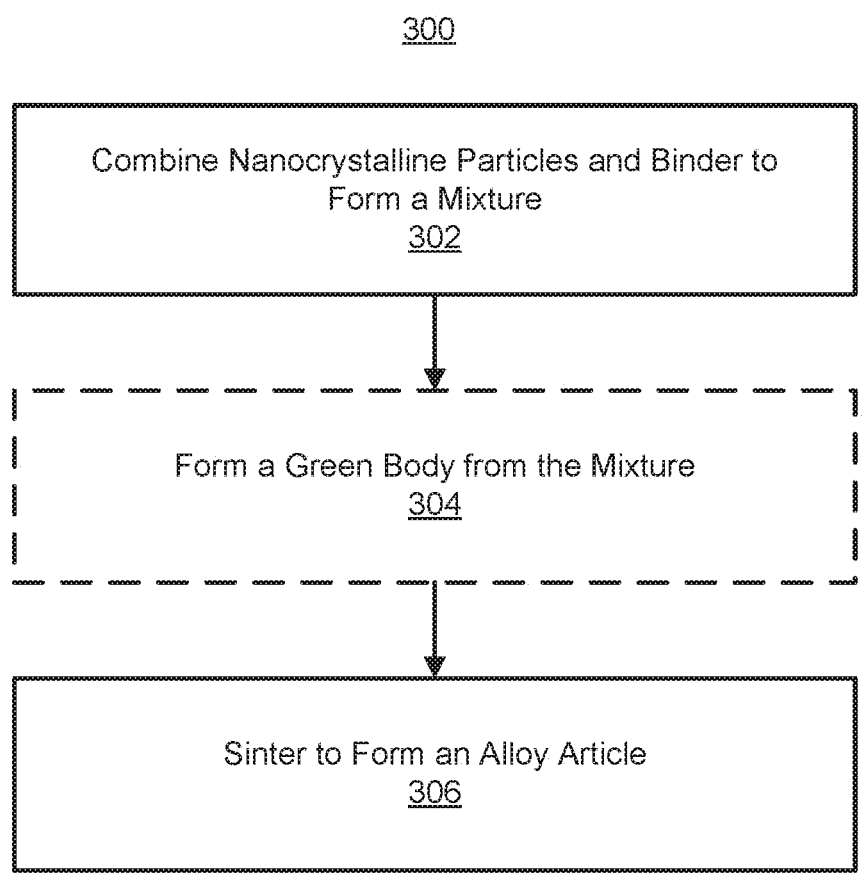
FIG. 3 shows a process flow diagram for creating a nanocrystalline (and/or microcrystalline) alloy article using additive manufacturing, according to an embodiment.

FIG. 3 shows a process flow diagram describing a manufacturing method 300 for producing a nanocrystalline (or microcrystalline) alloy article using additive manufacturing, according to an embodiment. The manufacturing method 300 includes combining a plurality of nanocrystalline alloy particles and a binder, at step 302. The nanocrystalline alloy particles can be any of the nanocrystalline (microcrystalline) alloy particles 140 described above with reference to FIG. 1 and the binder can be any of the binders 160 described above with reference to FIG. 1. Therefore, the nanocrystalline alloy particles and the binder are not described in further detail herein, and should be considered identical or substantially similar to the nanocrystalline alloy particles 140 and the binder 160 unless explicitly described differently.

In some embodiments, the ratio of the nanocrystalline alloy particles to the binder can be categorized in ratios by weight, by volume, or by atomic percentage. In some embodiments, the ratio of the nanocrystalline alloy particles to the binder can be the ratio where the amount of the binder is sufficient to hold the nanocrystalline alloy particles intact during sintering or during the formation of a green body.

In some embodiments, the nanocrystalline alloy particles and the binder can be combined in a container and agitated or stirred, or any other type or form of mixing, shaking, centrifuging, or blending. In some embodiments, a mixing method can include mechanically working the mixture. In some embodiments, the resulting mixture of the nanocrystalline alloy particles and the binder can be in the form of a dry mixture, a liquid, a semi-solid, a slurry, a gel, or a paste.

In some embodiments, the nanocrystalline alloy particles and the binder can be combined in a form of coating of the binder on the alloy particles. Therefore, the mixture of the nanocrystalline alloy particles and the binder can be a coating of binder on the alloy particles. The coating techniques can include liquid-phase (wet) chemistry or vapor-phase chemistry. Depending on the binder type, organic or inorganic, the technique can vary. As described herein, the binder can be coated to at least partially cover, substantially cover or fully cover the surface of the alloy particles.

Once a mixture of the nanocrystalline alloy particles and the binder is produced, a green body can be formed from the mixture, optionally at step 304. In some embodiments, the method of forming the green body can include any of the additive manufacturing techniques as described herein. In some embodiments, the additive manufacturing technique can be a powder bed system. In some embodiments, the additive manufacturing technique can be a powder feed system. In some embodiments, the additive manufacturing used to form the green body may include heating the mixture of the nanocrystalline alloy particles and the binder to a certain temperature to selectively melt the binder so as to cause the binder to bind to form a connected network of binder. In some embodiments, the connected network of binder can substantially hold the green body so as to maintain its shape and form. In some embodiments, the heating can be caused by the use of an electron beam, a high power laser beam or a plasma transferred arc beam. In some embodiments, the heating is sufficiently low enough that melting or sintering the nanocrystalline alloy particles can be substantially prevented.

In some embodiments, the additive manufacturing used to form the green body may include non-heating techniques to selectively cause the binder to bind so as to form a connected network of binder. In some embodiments, the connected network of binder can substantially hold the green body so as to maintain its shape and form. In some embodiments, the non-heating techniques may include, for example, chemically cross-linking the binder or ultra-violet activated cross-linking of the binder. In some embodiments, the binding of the binder can undergo via any number of chemical fusion processes.

Once a green body is formed, the green body can be sintered to form a nanocrystalline alloy article, at step 306. The sintering of the green body can be processed via any conventional sintering techniques. Examples of such sintering techniques are described in the '325 publication.

In some embodiments, the sintering temperature of one metal in the nanocrystalline alloy can be substantially high. In some embodiments, the binder has a volatilization temperature, where the sintering temperature is less than the volatilization temperature. In some embodiments, the binder is formulated to substantially vaporize during the sintering. In some embodiments, one metal material in the nanocrystalline alloy has a first sintering temperature. In some embodiments, the other metal material in the nanocrystalline alloy has a second sintering temperature. In some embodiments, the first sintering temperature is less than the second sintering temperature needed for sintering the first metal material in the absence of the second metal material.

In some embodiments, during the sintering, the binder is substantially vaporized leaving a dense nanocrystalline alloy article. In some embodiments, the bulk nanocrystalline alloy is substantially free of voids. In some cases voids may comprise less than 20% of the volume, less than 15%, less than 10%, less than 9%, less than 8%, less than 7%, less than 6%, less than 5%, less than 4%, less than 3%, less than 2%, less than 1%, less than 0.5%, less than 0.25%, less than 0.1%, less than 0.05%, or any combination of percentages or ranges thereof. In some embodiments, the nanocrystalline alloy article is substantially free of defects. In some embodiments, the nanocrystalline alloy article has a nanostructure or microstructure that is substantially similar to the nanostructure or microstructure of the nanocrystalline alloy particles before sintering. Said another way, the nanostructure or microstructure remains substantially unchanged and a minimal grain growth is observed. Structural comparison between the nanocrystalline alloy particles and the nanocrystalline alloy article after sintering shows that the crystalline grain size is substantially maintained in certain alloy systems. Examples of such alloy systems may include tungsten-chromium, tungsten-nickel, tungsten-copper, and many tungsten-based alloys, including binary, ternary, quaternary, and the likes. Other examples of such alloy systems may include chromium-based alloys. Other examples of such alloy systems may include alloys based on copper, molybdenum, palladium, platinum, nickel, cobalt, iron, titanium, vanadium, aluminum, manganese, tantalum, beryllium, bismuth, hafnium, iridium, lanthanum, magnesium, niobium, osmium, silicon, tin, yttrium, zinc, zirconium or scandium. In some embodiments, exemplary alloy systems that substantially maintain the grain size or that substantially resist microstructure evolution due to an external cause (e.g., heating from an electron beam, a high power laser beam, or a plasma transferred arc system) are described in the '325 publication.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." Any ranges cited herein are inclusive.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" may refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein "at. %" refers to atomic percent and "wt. %" refers to weight percent. However, in certain embodiments when "at. %" is utilized the values described may also describe "wt. %." For example, if "20 at. %" is described in one embodiment, in other embodiments the same description may refer to "20 wt. %." As a result, all "at. %" values should be understood to also refer to "wt. %" in some instances, and all "wt. %" values should be understood to refer to "at. %" in some instances.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

The invention claimed is:

1. A method of manufacturing a metal alloy article, comprising:
    disposing a plurality of nanocrystalline metal particles and a binder, the nanocrystalline metal particles having an average particle size of greater than about 1 µm;
    selectively binding the nanocrystalline metal particles together to form a green body;
    vaporizing the binder at a first temperature; and
    sintering the green body at a second temperature such that the nanocrystalline metal particles remain solid throughout the sintering to form the metal alloy article,
    wherein the second temperature is different than the first temperature.

2. The method of claim 1, wherein the nanocrystalline metal particles are disposed onto a substrate.

3. The method of claim 1, wherein the nanocrystalline metal particles are disposed using an additive manufacturing process.

4. The method of claim 3, wherein the nanocrystalline metal particles are disposed on at least one of a substrate and at least a portion of a prior layer from the additive manufacturing process.

5. A method of manufacturing a metal alloy article, comprising:
    combining a plurality of nanocrystalline particles and a binder to create an intermediate material, the nanocrystalline particles having an average particle size of greater than about 1 µm;
    selectively causing the binder to bind such that a connected network of intermediate material is formed;
    vaporizing the binder at a volatilization temperature; and
    sintering the connected network of intermediate material at a sintering temperature such that the nanocrystalline particles remain solid throughout the sintering to form the metal alloy article,
    wherein the sintering temperature is different than the volatilization temperature.

6. The method of claim 5, wherein the connected network is a green body.

7. The method of claim 6, wherein the green body is sintered to form the article.

8. The method of claim 5, wherein the plurality of nanocrystalline particles include a first plurality of nanocrystalline particles comprising a first metal material and a second plurality of nanocrystalline particles comprising a second metal material.

9. The method claim 5, wherein the binder includes a wax.

10. A method of manufacturing a metal alloy article, comprising:
disposing a plurality of nanocrystalline particles, the nanocrystalline particles including a first metal material and a second metal material and having an average particle size of greater than about 1 μm, and a binder;
selectively binding the nanocrystalline particles and/or the binder;
vaporizing the binder; and
after the binder is substantially vaporized, sintering the nanocrystalline particles at a sintering temperature such that the first metal material and the second metal material remain solid throughout the sintering to form the metal alloy article.

11. The method of claim 10, wherein selectively binding the nanocrystalline particles and/or the binder forms a green body.

12. A method of manufacturing a metal alloy article, comprising:
disposing a plurality of nanocrystalline particles and a binder, the nanocrystalline particles having an average particle size of greater than about 1 μm;
selectively binding the nanocrystalline particles and/or the binder;
vaporizing the binder at a first temperature; and
sintering the nanocrystalline particles at a second temperature such that the nanocrystalline particles remain solid throughout the sintering to form the metal alloy article,
wherein the second temperature is different than the first temperature.

13. The method of claim 12, wherein the first temperature is less than the second temperature.

14. The method of claim 12, wherein the nanocrystalline particles are coated with the binder.

15. The method of claim 1, wherein the plurality of nanocrystalline metal particles include a first plurality of nanocrystalline particles comprising a first metal material, and a second plurality of nanocrystalline particles comprising a second metal material.

16. The method of claim 10, wherein selectively binding the nanocrystalline particles and/or the binder includes a chemical fusion process.

17. The method of claim 12, wherein the plurality of nanocrystalline particles include a first plurality of nanocrystalline particles comprising a first metal material, and a second plurality of nanocrystalline particles comprising a second metal material.

18. The method claim 5, wherein the binder includes a polymer.

19. The method claim 5, wherein the binder includes a metal.

* * * * *

UNITED STATES PATENT AND TRADEMARK OFFICE
CERTIFICATE OF CORRECTION

PATENT NO. : 10,596,628 B2  
APPLICATION NO. : 15/449475  
DATED : March 24, 2020  
INVENTOR(S) : Lund et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 88 days.

Signed and Sealed this  
Twenty-fourth Day of November, 2020

Andrei Iancu  
*Director of the United States Patent and Trademark Office*